United States Patent
Weinstock

[15] 3,681,673
[45] Aug. 1, 1972

[54] CHARGER FOR RECHARGEABLE CELL

[72] Inventor: Irwin B. Weinstock, Gainesville, Fla.
[73] Assignee: General Electric Company
[22] Filed: March 30, 1971
[21] Appl. No.: 129,509

[52] U.S. Cl. ..........................320/9, 320/20, 320/36, 320/38
[51] Int. Cl. ................................................H02j 7/00
[58] Field of Search..........................320/5, 8–11, 14, 320/21, 30, 35, 36, 39, 40, 37, 38

[56] References Cited
UNITED STATES PATENTS 3,517,293 6/1970 Burkett et al. ..............320/39 X
3,356,922 12/1967 Johnston..........................320/6
2,987,747 6/1961 Oishel et al. ...........318/443 UX

*Primary Examiner*—J. D. Miller
*Assistant Examiner*—Robert J. Hickey
*Attorney*—Nathan J. Cornfeld, John P. Taylor, Frank L. Neuhauser, Oscar B. Waddell and Joseph B. Forman

[57] ABSTRACT

A charger for a rechargeable cell is provided having means for first discharging the cell and then charging the cell for a predetermined time period. A thermally responsive relay is simultaneously heated during the discharge period until contacts on the relay close to complete a charging circuit to the cell. The time period of the charge is determined by the amount of time necessary for the relay to cool and move the contacts to an open position. In a preferred embodiment heating of the thermally responsive relay is reduced or terminated simultaneous with closing of the charging circuit.

7 Claims, 6 Drawing Figures

PATENTED AUG 1 1972
3,681,673
SHEET 1 OF 2
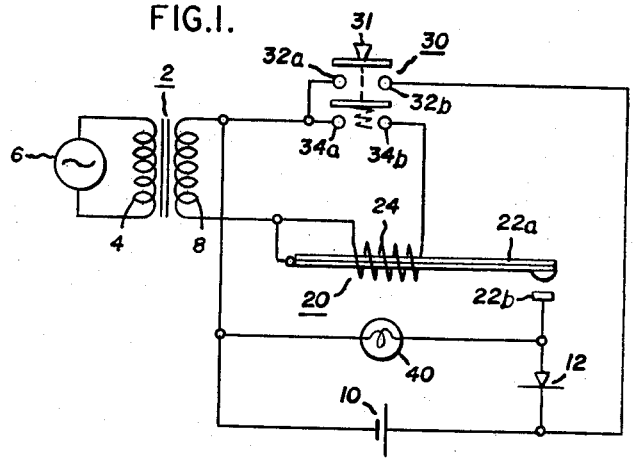
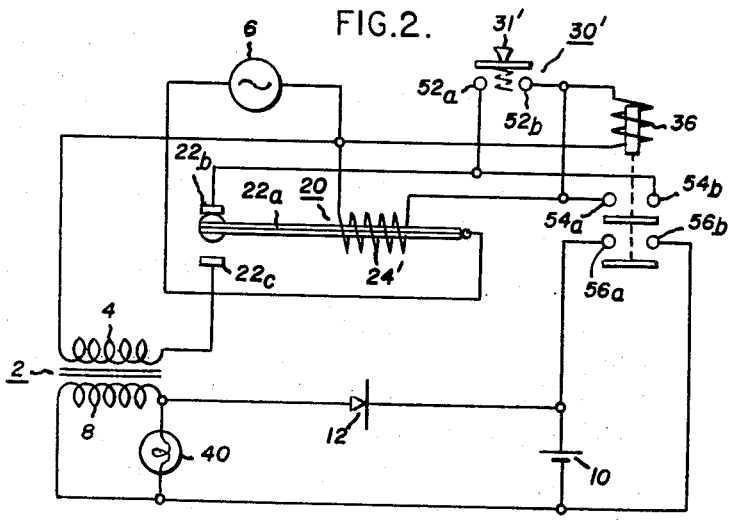
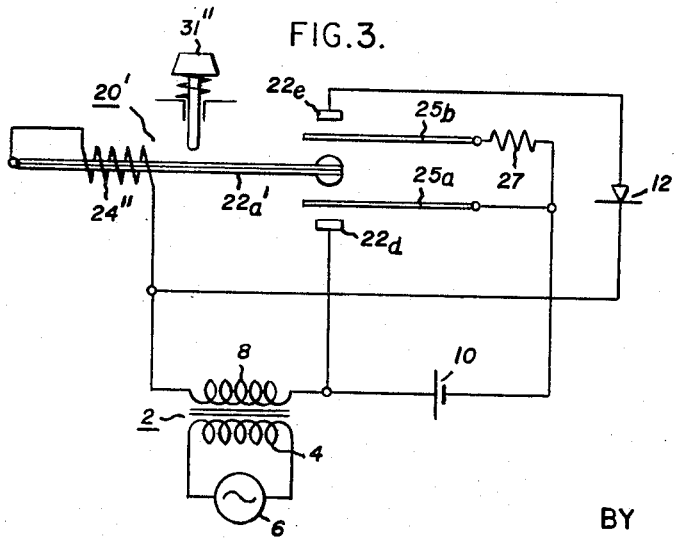
INVENTOR:
IRWIN B. WEINSTOCK,
BY John P. Taylor
HIS ATTORNEY.

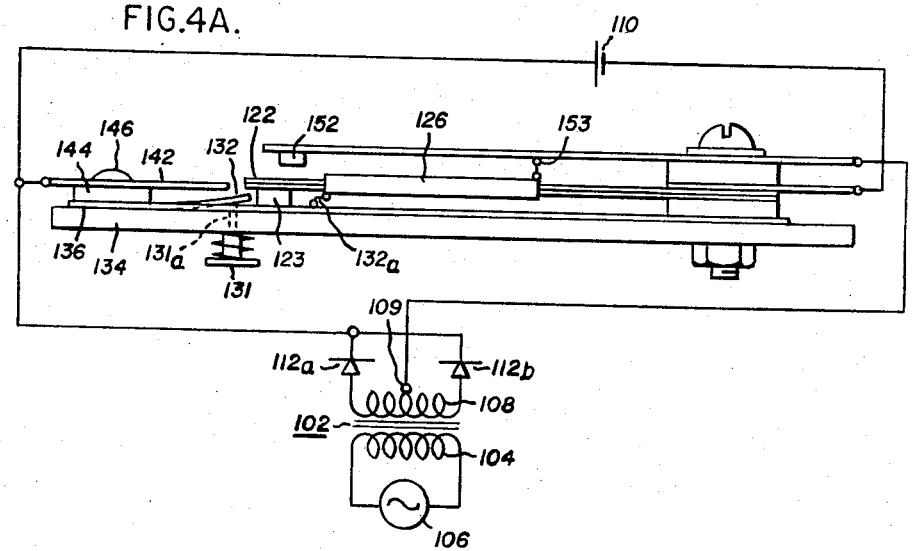
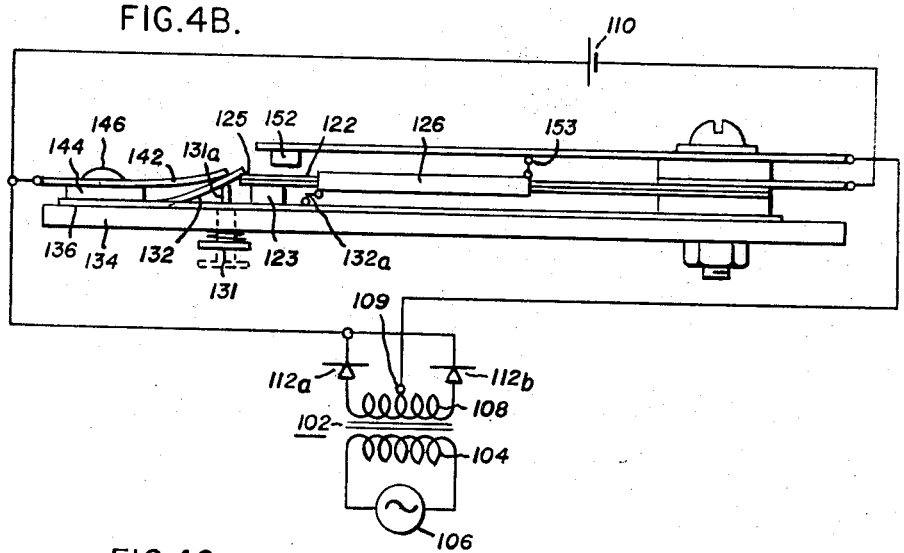
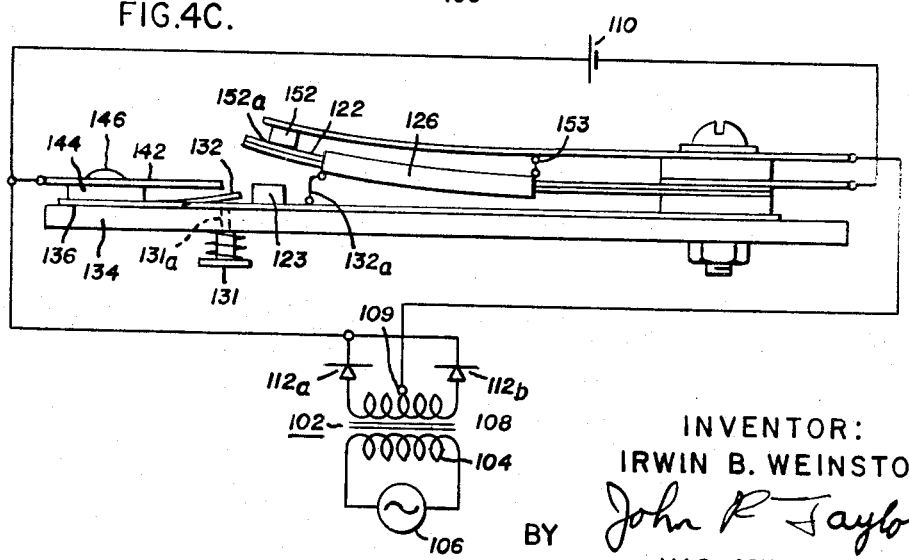

3,681,673

CHARGER FOR RECHARGEABLE CELL

BACKGROUND OF THE INVENTION

This invention relates to chargers for rechargeable cells. More particularly, this invention relates to a charger having a thermal means to control fast charging of a rechargeable cell.

Rechargeable cells are normally recharged at relatively low rates to avoid build-up of excessive gas pressures which can occur at high charge rates after the cell has become completely charged. During overcharge at low charge rates, oxygen evolved at the positive electrode is used up by the cell (in oxidizing the negative electrode) as fast as it is evolved and hence little, if any, pressure build-up occurs. However, such low charge rates are less than satisfactory because the rechargeable cell is out of service for an extended period of time.

To solve this problem it has been proposed to carefully measure the amount of charge to be replaced in the battery and to thereby avoid overcharge and resultant evolution of gas. This involves the determination of (a) the capacity of the cell, (b) the amount of charge within the cell, and (c) the amount of charge to be injected into the cell. The first parameter is, of course, fixed by the construction of the cell. The state of charge can be determined in some cells, for example, in a lead acid cell by a simple measurement of the density of the electrolyte. In any type of cell, the state of charge can be reduced to a low level approximately zero by discharging the cell. Once the capacity of the cell and the state of charge are known, the amount of charge necessary to bring the cell to a full charge condition can be readily calculated. By injecting only this amount of charge, overcharging and resultant gassing can be avoided. With the problem of gassing minimized, higher charge rates can be utilized.

SUMMARY OF THE INVENTION

It is therefore an object of this invention to provide means for safely charging a rechargeable cell at a fast charge rate.

It is another object of the invention to provide means to adjust the state of charge of a rechargeable cell to a predetermined amount.

It is a further object of the invention to provide means for controlling the amount of charge to be injected into the cell.

These and other objects of the invention will be more fully understood by referring to the description and the accompanying drawings.

In accordance with a preferred embodiment of the invention and briefly stated, a charger for a rechargeable cell is provided having a sequential discharge mode and charging mode comprising:
a. means for simultaneously activating: (1) a cell discharge circuit and (2) a heater circuit for a thermal relay;
b. means for simultaneously deactivating: (1) the cell discharge circuit and (2) the heater circuit;
c. thermal relay means including contact means having a first position and a second position and thermally responsive means for moving the contacts from one normal position to the other position;
d. a charging circuit activated by the movement of the relay contacts by the thermally responsive means, the thermally responsive means acting to hold the contacts in a charging circuit activating position for a predetermined time sufficient to place a predetermined amount of charge in the rechargeable cell.

BRIEF DESCRIPTION OF THE DRAWINGS

FIG. 1 is a schematic diagram of one embodiment of the invention.

FIG. 2 is a schematic diagram of another embodiment of the invention.

FIG. 3 is a schematic diagram of another embodiment of the invention.

FIGS. 4a, 4b, and 4c comprise pictorial views illustrating sequential operating modes of another embodiment of the invention.

DESCRIPTION OF THE PREFERRED EMBODIMENTS

Referring now to FIG. 1, a schematic diagram of an embodiment of the invention is illustrated. A transformer 2 having a primary winding 4 connected to a power source 6 has a secondary winding 8 to provide a source of low voltage charging current to recharge a rechargeable cell 10 through a diode 12.

A thermal relay 20 has a set of normally open contacts 22a and 22b in series with cell 10 and diode 12 across secondary winding 8. Contact 22a comprises a bimetallic strip of two metals having dissimilar co-efficients of expansion as will be explained.

A push-button-actuated switch 30 contains two pairs of contacts 32a, 32b, and 34a, 34b which are in a normally open position. Depression of push-button 31 completes a cell discharge circuit through contacts 32a and 32b and a second, relay heater circuit, through contacts 34a and 34b to provide current flow through heater coil 24 of thermal relay 20.

The flow of current through heater coil 24 causes bimetallic contact 22a to heat and, as is well known in the art, to bend due to the dissimilar co-efficients of expansion of the metals. Contact 22a thereby bends into engagement with contact 22b to activate the charging circuit. An indicator lamp 40 is illuminated when the charging circuit is completed. At this point, push-button switch 30 is released. The cell 10 is then charged for a period of time determined by the cooling rate of contact 22a which will eventually separate from contact 22b as contact 22a cools.

The amount of charge applied to the cell thus can approximate the total charge capacity of cell 10 since the charge cycle commences after complete discharge of cell 10. In actual practice a somewhat lesser amount of charge is injected for two reasons: first, an instantaneous discharge for a short period can result in a small amount of residual charge remaining; secondly, a rapid charge does not actually reduce or oxidize (depending upon which electrode one is examining) all of the material theoretically capable of oxidizing or reducing. Therefore, a lessor percentage of theoretical full charge capacity, for example, 50–75 percent is injected into cell 10. Once the amount of charge to be injected is determined, the charging rate is calculated by dividing the amount of charge by the time during which contacts 22a and 22b will be engaged.

Another embodiment is illustrated in FIG. 2 in which a push-button switch 30' need only be depressed momentarily to activate a latching relay circuit through a relay coil 36. Depression of push-button 31' completes a circuit from power source 6 through the contacts 22a and 22b of thermal relay 20', through the relay coil 36 and contacts 52a and 52b of switch 30'. Activation of relay coil 36 closes contacts 54a and 54b which energizes a latching circuit through coil 36 and also energizes thermal relay heater 24'.

A second set of contacts 56a and 56b are also closed by the energization of relay coil 36 to complete a discharge circuit to discharge cell 10.

When heater 24' heats bimetallic member 22a of thermal relay 20' to a sufficient temperature to cause it to break the connection with contact 22b, relay coil 36 is inactivated and both the cell discharge circuit through contacts 56a and 56b and the heater energizing circuit through contacts 54a and 54b are broken.

The heating and resultant bending of bimetallic contact member 22a causes it to touch contact 22c to thereby initiate the charging circuit by activating primary winding 4 of transformer 2 to induce a current flow through secondary winding 8 and diode 12 to cell 10. Current flow continues until member 22a cools sufficiently to break the charging circuit.

In FIG. 3, another embodiment is illustrated in which push-button 31'' is momentarily depressed to urge bimetallic contact 22a' against a contact leaf 25a which in turn is pushed against a contact 22d to form a three-point contact. Contact 22d is slightly magnetized to hold contact 22a' and contact leaf 25a thereby maintaining the three-point contact. This completes a cell discharge circuit from contact 22d through contact 25a and a second, heater circuit, from contact 22a' to contact 22d.

When heater 24'' heats bimetallic contact 22a' sufficiently, the bimetallic member overcomes the magnetic attraction of contact 22d and bends into engagement with contact leaf 25b and contact 22e. This completes a charging circuit between contact 25b and contact 22e and also provides a second heater path from contact 22a' through contact 25b. This heater circuit, however, also includes a resistor 27 to limit the flow of current through heater coil 24''. By so limiting the current an insufficient amount of heat will be generated to maintain bimetallic contact 22a' permanently in the bent, heated, condition. The reduced flow of current through the heater will, however, slow the cooling and thus lengthen the amount of time in which the charging circuit is activated.

In the embodiment illustrated in FIG. 3 the initial making of the discharge circuit through contacts 22a' and 22d is maintained by the magnetic attraction therebetween instead of by a latching relay circuit as in FIG. 2. The bending of contact 22a' upon heating overcomes the magnetic attraction to break the connection. In similar fashion, contact 22e may be constructed of magnetic material to extend the time period during which contacts 22a' and 22e will touch. The magnetic force of 22e must be less than the inherent spring tension of contact 22a' when cold, however, to allow disengagement of the contacts and termination of the charge cycle.

In FIGS. 4a, 4b, and 4c another embodiment is illustrated wherein a push-button 131 is manually depressed to activate a cell discharge circuit and a heater circuit. A latching mechanism, as will be described, maintains activation of this circuit until the heater heats a bimetallic contact sufficiently to overcome the latching mechanism and the bimetallic contact moves to a position to complete a charging circuit.

FIG. 4a illustrates the device before depression of push-button 131. A spring metal contact 132 is fastened to an insulated substrate 134 at 136 and is biased to rest upon the end 131a of push-button 131.

Depression of button 131 pushes contact 132 against another spring metal contact 142 which is mounted to an insulator 144 at 146. Contact 142 is thereby bent upwardly against its spring bias causing it to make firm contact with contact 132. At the same time, contact 132 also pushes bimetallic contact 122 upward until contact 132 slips by contact 122 which is biased to rest against a stop 123. Release of push-button 131 allows contact 132 to push against the contact 122 at 125 as shown in FIG. 4b.

In the position illustrated in FIG. 4b, a cell discharge circuit is complete by the contacts 122, 132, and 142. At the same time heater coil 126 is activated by current from transformer 102 passing through contacts 142, and 132 through extension 132a to one side of coil 126 and then from coil 126 via another contact 152 at 153 back to a center tap 109 on secondary winding 108.

As heater coil 126 heats bimetallic contact 122, contact 122 begins to bend upwardly toward contact 152 and against the downward bias of contact 132. When contact 122 bends sufficiently, contact 132 slips back to its initial position against push-button 131 at 131a and contact 122, freed from the bias of contact 132 which resisted the bending of contact 122, springs into contact with contact 152 at 152a as shown in FIG. 4c.

The cell discharge circuit and the heater circuit are now open and instead a cell charging circuit is completed through contacts 122 and 152 to pass full-wave rectified current from diodes 112a and 112b to cell 110. The charging circuit remains activated until bimetallic contact 122 cools sufficiently to disengage from contact 152 to break the circuit.

It should be noted that in some of the illustrated embodiments the time period of the charge cycle is controlled only by cooling of the bimetallic contact. The amount of total charge can then only be increased for a given structure by increasing the charge rate. The amount of charge rate increase which the device will be capable of handling will depend then on the current-carrying capabilities of the various contacts.

In an alternate embodiment, the amount of total charge can be increased by increasing the time of charge rather than the rate by providing a second heating coil around the bimetallic contact which coil is in series with the charge circuit. The resistance of this coil is adjusted to provide an amount of heat insufficient to permanently maintain the bimetallic member in its bent form but sufficient to protract the cooling period and thereby increase the charge period.

It should also be noted that the thermally responsive element, i.e. the bimetallic member may, instead of directly carrying electrical contacts thereon, be mechanically coupled to a movable contact which in turn is capable of carrying electrical current.

It should also be noted that in the various embodiments, the control elements have been shown both on the primary and the secondary sides of the transformer.

Full-wave and half-wave rectification have also been illustrated. It is anticipated that in any of the embodiments, the control elements can be placed either on the primary or secondary sides of the transformer by those skilled in the art making the necessary resistance changes, for example, in the heater coil. Similarly full-wave or half-wave rectification can be utilized by those skilled in the art without departing from the spirit of the invention.

What is claimed is:

1. Charging apparatus for recharging a cell of known capacity with a predetermined amount of charge without overcharging the cell by first discharging the cell to a low level of approximately zero comprising:
   a. a heater circuit for a resistance heater, a cell discharge circuit for reducing the level of charge in the cell to approximately zero and actuating means for simultaneously actuating both circuits;
   b. thermally responsive relay means adjacent said resistance heater and having contact means thereon;
   c. a charging circuit including a source of charging current in series with said rechargeable cell and contact means on said thermally responsive relay to provide a preselected constant charge rate, said charging circuit being actuated by said relay means in response to heat from said heater;
   d. means for deactuating said cell discharge circuit when said charging circuit is actuated; and
   e. means for reducing the heat generated by said heater after said charging circuit is actuated to provide a timed charge to said cell;

whereby said charge rate may be preselected to provide within the timed interval a predetermined amount of charge which is less than the total capacity of said cell to prevent overcharging.

2. The charger of claim 1 wherein said means for actuating the cell discharge circuit and heater circuit comprise manually actuated means.

3. The charger of claim 1 wherein said contact means on said thermally responsive relay means include normally open contacts which are closed by said relay means in response to heat received from said heater.

4. A charger for a rechargeable cell having a sequential discharge mode and a charging mode comprising:
   a. a cell discharge circuit, a first heater circuit for a resistance heater and means for simultaneously actuating both circuits;
   b. thermally responsive relay means adjacent said resistance heater including first normally open contact means in series with said heater circuit and manually actuable to a closed position and second normally open contact means closable in response to heat from said heater, the closing of said second contact means simultaneously opening said first contact means;
   c. a charging circuit including a source of charging current in series with said rechargeable cell and contact means on said thermally responsive relay, said charging circuit being actuated by said relay means in response to heat from said heater;
   d. means for deactuating said cell discharge circuit when said charging circuit is actuated;
   e. and means for reducing the heat generated by said heater after said charging circuit is actuated to provide a timed charge of said cell comprising a second heater circuit in series with said second contact means and including impedance means therein to reduce the flow of current to said heater.

5. The charger of claim 4 wherein said contact means includes at least one magnetized contact.

6. A charger for a rechargeable cell having a sequential discharge mode and charging mode comprising:
   a. a manually depressable push-button having first contact means associated therewith for simultaneously closing a cell discharge circuit and a heater circuit for a heater;
   b. latching means for said contact means to maintain said contact means in said circuit closing position for a predetermined period of time;
   c. a charging circuit including a source of charging current in series with said cell; and
   d. thermally responsive contact means adjacent said heater movable in response to heat to (1) unlatch said first contact means and break the discharge and heating circuits closed thereby and (2) to close contacts energizing said charging circuit for a predetermined time period until said thermally responsive contact means cools sufficiently to open said charging circuit contacts.

7. The charger of claim 6 wherein said first contact means includes first and second yieldable contact arms, said first contact arm is urged by depression said manually depressible push-button against said second yieldable arm and simultaneously is latched into contact with said thermally responsive contact means.

* * * * *